(12) United States Patent
Yu et al.

(10) Patent No.: US 10,355,563 B2
(45) Date of Patent: Jul. 16, 2019

(54) MOTOR STATOR ASSEMBLY AND WIRE-MANAGING STRUCTURE THEREOF

(71) Applicant: DELTA ELECTRONICS COMPONENTS (WUJIANG) LTD., Wujiang, Jiang Su Province (CN)

(72) Inventors: Fulei Yu, Wujiang (CN); Liangjun Zhang, Wujiang (CN); Zhaoyang Jin, Wujiang (CN); Cheng-Hsien Yeh, Wujiang (CN)

(73) Assignee: DELTA ELECTRONICS COMPONENTS (WUJIANG) LTD., Wujiang (CN)

( * ) Notice: Subject to any disclaimer, the term of this patent is extended or adjusted under 35 U.S.C. 154(b) by 483 days.

(21) Appl. No.: 15/342,867

(22) Filed: Nov. 3, 2016

(65) Prior Publication Data
US 2017/0133915 A1    May 11, 2017

(30) Foreign Application Priority Data

Nov. 6, 2015    (CN) .......................... 2015 1 0753835

(51) Int. Cl.
*H02K 3/52* (2006.01)
*H02K 11/00* (2016.01)
*H02K 15/00* (2006.01)

(52) U.S. Cl.
CPC ......... *H02K 11/0094* (2013.01); *H02K 3/522* (2013.01); *H02K 15/0068* (2013.01); *H02K 2203/03* (2013.01)

(58) Field of Classification Search
CPC ...... H02K 3/52–3/528; H02K 11/0094; H02K 15/0068; H02K 2203/03

USPC ....................................... 310/71, 67 R, 254.1
See application file for complete search history.

(56) References Cited

U.S. PATENT DOCUMENTS 5,828,147 A  * 10/1998  Best ...................... H02K 3/522
                                                              310/71
8,450,898 B2 *  5/2013  Sears .................... H02K 3/522
                                                              310/194

FOREIGN PATENT DOCUMENTS

| CN | 1874112 A   | 12/2006 |
| CN | 102207095 A | 10/2011 |
| CN | 102457120 A | 5/2012  |
| CN | 203288788 U | 11/2013 |
| TW | 201021368 A | 6/2010  |
| TW | M419336 U   | 12/2011 |
| TW | M497717 U   | 3/2015  |
| TW | M499003 U   | 4/2015  |

* cited by examiner

*Primary Examiner* — Thomas Truong
(74) *Attorney, Agent, or Firm* — Kirton McConkie; Evan R. Witt (57) ABSTRACT

A motor stator assembly includes a stator core, at least one winding coil, a circuit board, a metallic post and a covering member. The stator core includes plural poles. The winding coil is wound around the corresponding pole. The metallic post has a first end surface and a second end surface. The second end surface is attached on the circuit board. The covering member is used for partially covering the metallic post. The covering member includes plural protrusion parts and plural notches. A bottom surface of the notch is not higher than the first end surface. A top surface of the protrusion part is not lower than the first end surface. An outlet part of the winding coil is transferred through at least two of the plural notches and fixed on the first end surface.

15 Claims, 8 Drawing Sheets

MOTOR STATOR ASSEMBLY AND WIRE-MANAGING STRUCTURE THEREOF

FIELD OF THE INVENTION

The present invention relates to a stator assembly, and more particularly to a stator assembly of a motor and a wire-managing structure of the stator assembly.

BACKGROUND OF THE INVENTION

With the rapid development of science and technology, portable electronic devices such as notebook computers, tablet computers or mobile phones are developed to have compact mechanisms, complete functions, longer standby time and faster cooling efficiency. Generally, a motor is one of the essential components of the electronic device. For miniaturization and slimness, the circuit board for installing a motor driving circuit is changed from a rigid circuit board to a flexible printed circuit board (FPC). The use of the flexible printed circuit board can effectively save the layout space in order to further achieve miniaturization and slimness of the motor. Moreover, for withstanding a high voltage and optimizing the production line, the copper wires of the motor is welded onto the flexible printed circuit board outside of the motor. Under this circumstance, the volume of the motor cannot meet the miniaturization requirement. For solving this drawback, the welding joints of the copper wires on the flexible printed circuit board are integrated into the inner portion of the motor.

Figure 1:
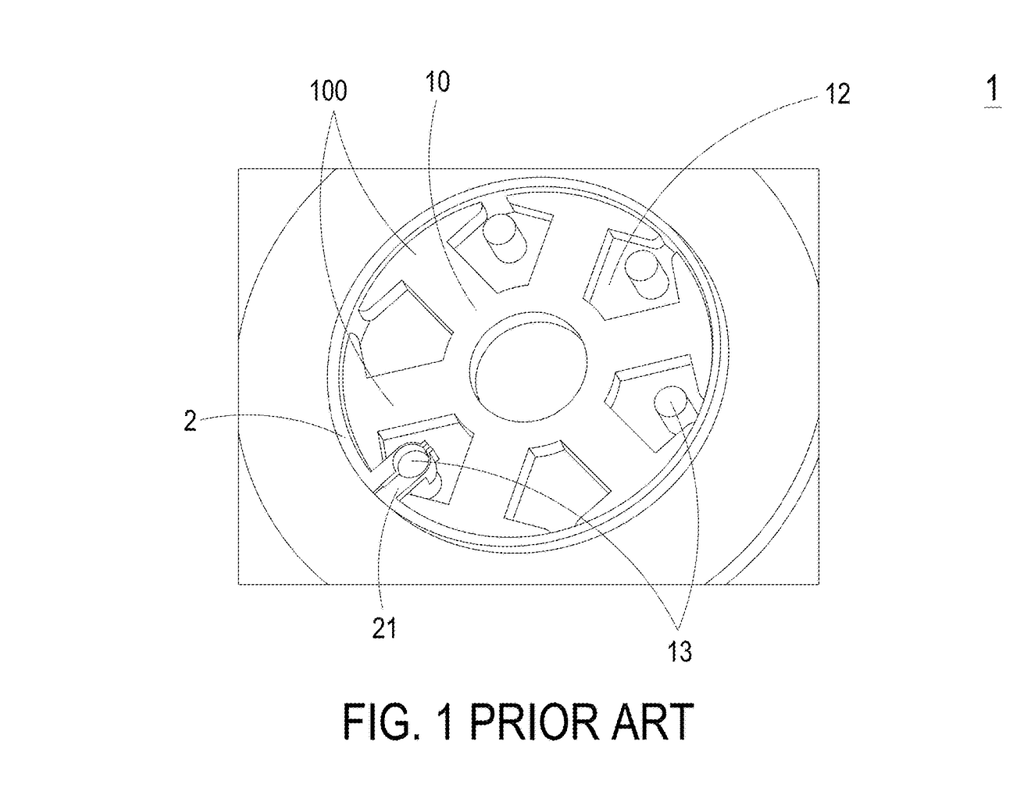
FIG. 1 schematically illustrates a conventional motor stator assembly using a jig tool to weld a copper wire.
Figure 2:
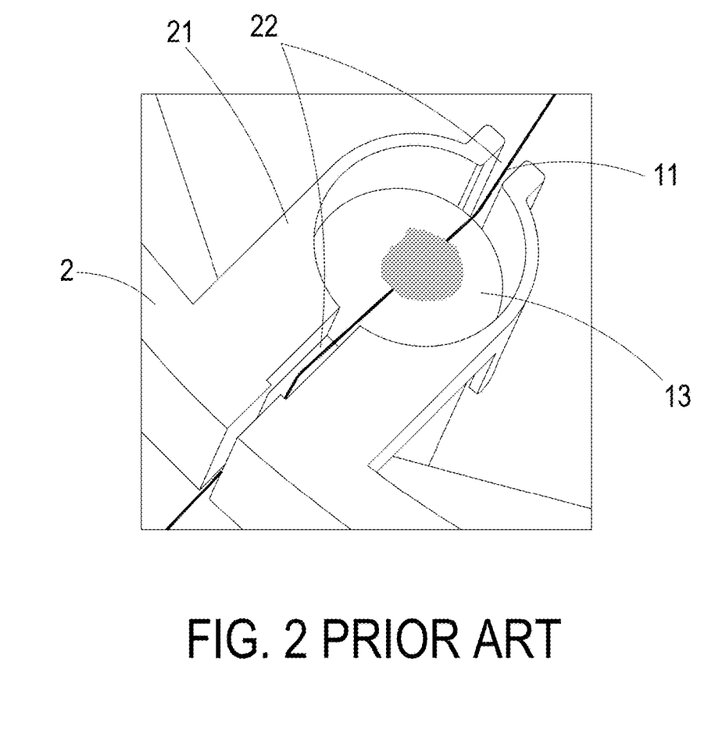
FIG. 2 is an enlarged fragmentary view illustrating the relationship between a positioning part of the jig tool, an outlet part of a winding coil and the copper post.

FIG. 1 schematically illustrates a conventional motor stator assembly using a jig tool to weld a copper wire. FIG. 2 is an enlarged fragmentary view illustrating the relationship between a positioning part of the jig tool, an outlet part of a winding coil and the copper post. As shown in FIGS. 1 and 2, the conventional motor stator assembly 1 comprises a stator core 10, at least one winding coil 11 (i.e., a copper wire), a circuit board 12 and plural copper posts 13. The stator core 10 is combined with the circuit board 12. The stator core 10 comprises plural poles 100. The at least one winding coil 11 is wound around the plural poles 100. The plural copper posts 13 are disposed on the circuit board 12. Moreover, each copper post 13 is arranged between two adjacent poles 100 of the stator core 10. After the winding coil 11 is wound around the plural poles 100 of the stator core 10, a jig tool 2 is positioned on the corresponding cooper post 13, wherein a positioning part 21 of the jig tool 2 is sheathed around the corresponding copper post 13. The positioning part 21 of the jig tool 2 has a wire-managing groove 22. Consequently, an outlet part of the winding coil 11 is transferred through the wire-managing groove 22 and welded on a center position of an end surface of the copper post 11 by a thermal welding process or a low current welding process. Consequently, a driving circuit (not shown) of the circuit board 12 can control the winding coil of each pole through the conductive path of the copper post 13. Under this circumstance, the motor is drive to rotate.

However, the conventional method of fabricating the motor stator assembly still has some drawbacks. For example, it takes long time to remove or place the jig tool 2. Moreover, since the inner space of the motor is very small, it is difficult to design an easy-to-use jig tool 2. Moreover, during the process of removing or placing the jig tool 2, the insulation layer of the stator core 10 and the enamel coat of the winding coil 11 are readily scratched. If the enamel coat of the winding coil 11 is scratched, the voltage-withstanding capability is impaired. Moreover, the efficacy of positioning the outlet part of the winding coil 11 according to the conventional technology is usually unsatisfied. Consequently, if an automatic welding process is used to position the outlet part of the winding coil 11, a false welding problem may occur. Under this circumstance, the product reliability is reduced.

SUMMARY OF THE INVENTION

An object of the present invention provides a motor stator assembly and a wire-managing structure. Since the outlet part of the winding coil is directly connected with a metallic post without the assistance of the jig tool, the operating time is largely reduced. In accordance with the conventional technology, the insulation layer of the stator core and the enamel coat of the winding coil are readily scratched during the process of removing or placing the jig tool. Since no jig tool is used according to the present invention, the precision of positioning and welding the outlet part of the winding coil will be increased and the false welding problem will be overcome. Under this circumstance, the product reliability is reduced.

In accordance with an aspect of the present invention, there is provided a motor stator assembly. The motor stator assembly includes a stator core, at least one winding coil, a circuit board, at least one metallic post and at least one covering member. The stator core includes plural poles. The at least one winding coil is wound around the plural poles of the stator core. The at least one winding coil includes at least one outlet part. Each metallic post has a first end surface and a second end surface. The second end surface of the metallic post is attached on the circuit board. The at least one covering member is used for partially covering the metallic post. The covering member includes plural protrusion parts and plural notches. Moreover, each of the plural notches is arranged between two adjacent protrusion parts. A bottom surface of the notch is not higher than the first end surface of the metallic post. A top surface of the protrusion part is not lower than the first end surface of the metallic post. The outlet part of the winding coil is accommodated within at least two of the plural notches and fixed on the first end surface of the metallic post.

In accordance with another aspect of the present invention, there is provided a wire-managing structure for a motor stator assembly. The motor stator assembly includes a circuit board and a stator core. The wire-managing structure includes a metallic post and a covering member. The metallic post has a first end surface and a second end surface. The second end surface is attached on the circuit board. The covering member is used for partially covering the metallic post. The covering member includes plural protrusion parts and plural notches. Moreover, each of the plural notches is arranged between two adjacent protrusion parts. A bottom surface of the notch is not higher than the first end surface of the metallic post. A top surface of the protrusion part is not lower than the first end surface of the metallic post.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown. For well understanding the present invention, the elements shown in the drawings are not in scale with the elements of the practical product.

Figure 3:
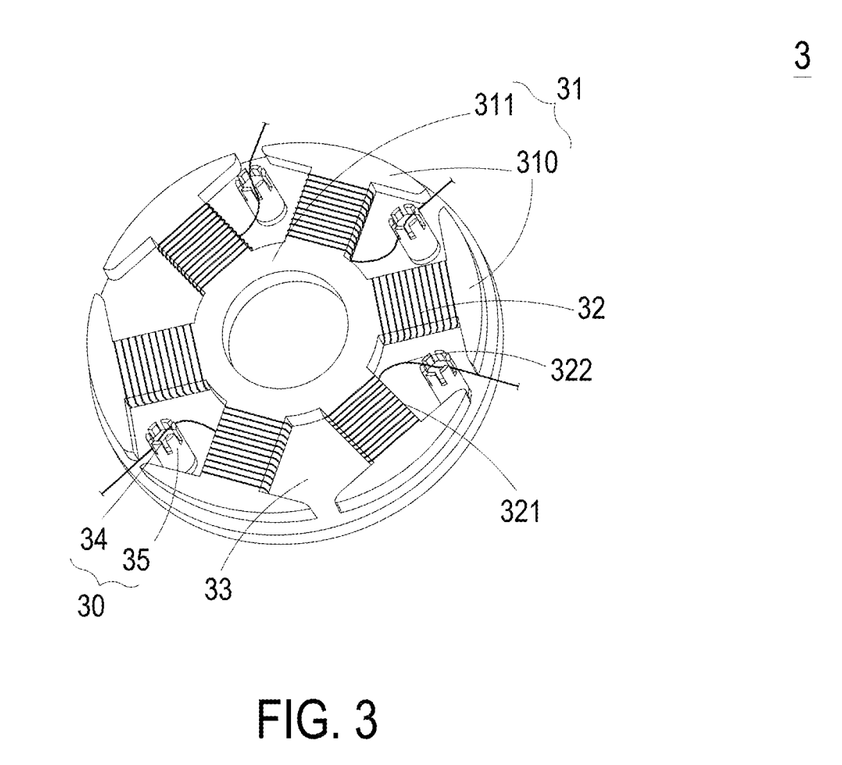
FIG. 3 is a schematic perspective view illustrating a motor stator assembly according to an embodiment of the present invention.
Figure 4:
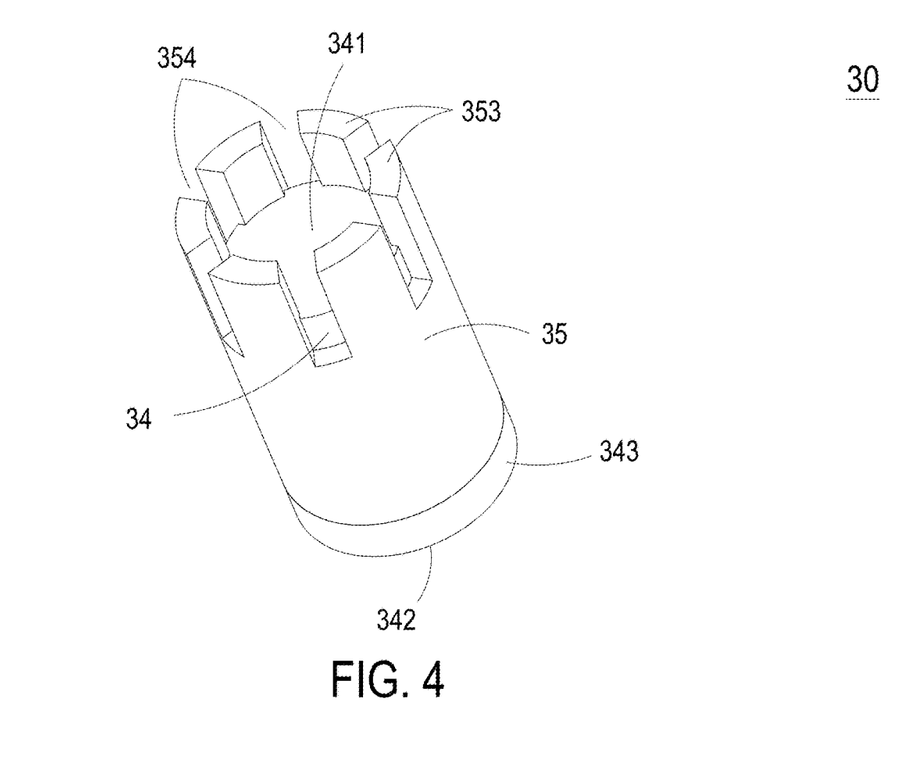
FIG. 4 is a schematic perspective view illustrating an exemplary wire-managing structure used in the motor stator assembly of FIG. 3.
Figure 5:
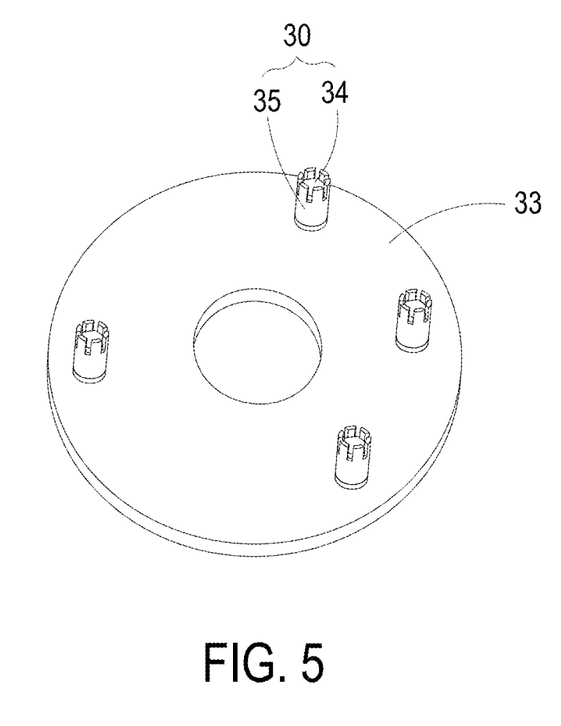
FIG. 5 is a schematic perspective view illustrating the combination of the circuit board and the wire-managing structure used in the motor stator assembly of FIG. 3.
Figure 6:
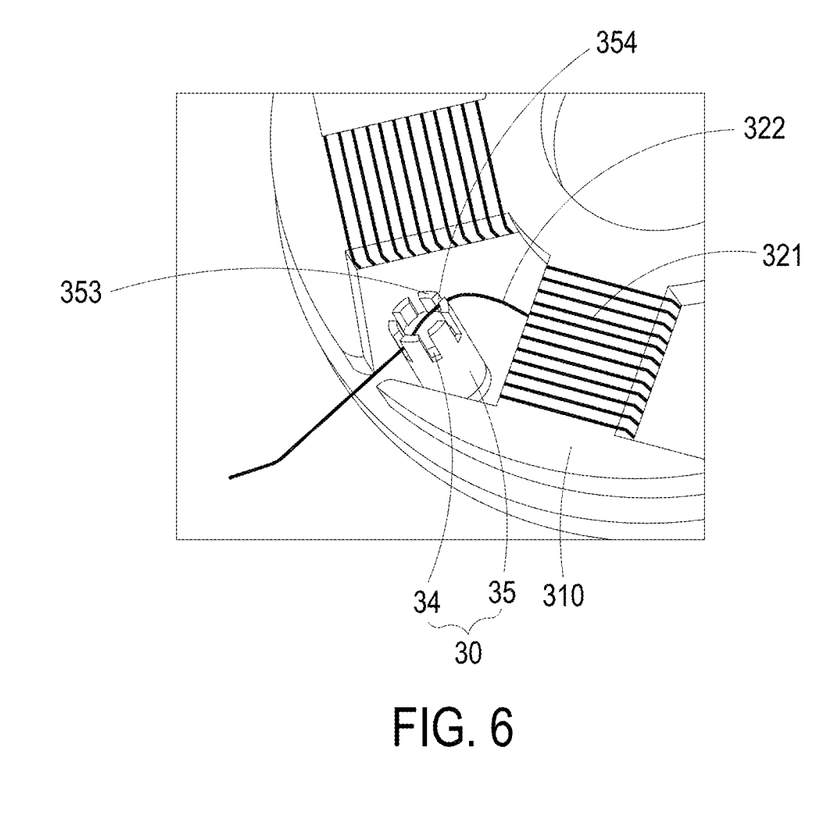
FIG. 6 is an enlarged fragmentary view illustrating the relationship between the wire-managing structure and the outlet part of the winding coil.

FIG. 3 is a schematic perspective view illustrating a motor stator assembly according to an embodiment of the present invention. FIG. 4 is a schematic perspective view illustrating an exemplary wire-managing structure used in the motor stator assembly of FIG. 3. FIG. 5 is a schematic perspective view illustrating the combination of the circuit board and the wire-managing structure used in the motor stator assembly of FIG. 3. FIG. 6 is an enlarged fragmentary view illustrating the relationship between the wire-managing structure and the outlet part of the winding coil. As shown in FIGS. 3, 4, 5 and 6, the motor stator assembly 3 comprises a stator core 31, at least one winding coil 32, a circuit board 33 and at least one wire-managing structure 30. The wire-managing structure 30 comprises a metallic post 34 and a covering member 35. The stator core 31 comprises plural poles 310 and a ring-shaped part 311. The plural poles 310 are connected with the ring-shaped part 311 and externally extended from the ring-shaped part 311 along a radial direction. Moreover, the plural poles are discretely arranged at regular intervals. It is noted that the structure of the stator core is not restricted. For example, in another embodiment, the plural poles are internally extended from the ring-shaped part along the radial direction. In an embodiment, the stator core 31 is a single-layer structure or a multi-layer stack structure. Moreover, the stator core 31 is made of silicon steel. In this embodiment, the motor stator assembly 3 comprises plural winding coils 32. The plural winding coils 32 are wound around the plural poles 310 of the stator core 31, respectively. Each winding coil 32 comprises a coil part 321 and an outlet part 322. The coil part 321 is wound around the corresponding pole 310.

It is preferred that the circuit board 33 is a flexible printed circuit board. Moreover, the circuit board 33 and the stator core 31 are combined together. The metallic post 34 comprises a first end surface 341 and a second end surface 342. The second end surface 342 is attached on the circuit board 33. Each metallic post 34 is arranged between two adjacent poles 310. In this embodiment, the stator core 31 has six poles 310, and the motor stator assembly 3 has four metallic posts 34. It is noted that the number of the poles 310 of the stator core 31 and the number of the metallic posts 34 may be varied according to the practical requirements. Preferably, the number of the metallic posts 34 is determined according to the number of phases of the motor. For example, in case that the motor has n phases, the number of the metallic posts 34 is n+1 or n. In this embodiment, the motor is in a three-phase star connection, and thus the number of the metallic posts 34 is four. In particular, the four metallic posts 34 are connected with the winding coils 32 corresponding to the three phases and the common terminal, respectively. In some other embodiments, the motor is in a three-phase delta connection, and thus the number of the metallic posts 34 is three.

The covering member 35 covers at least a part of the metallic post 34. In addition, the covering member 35 comprises plural protrusion parts 353 and plural notches 354. The plural protrusion parts 353 and the plural notches 354 are located near the first end surface 341 of the metallic post 34. Moreover, the plural protrusion parts 353 and the plural notches 354 are alternately arranged at an end of the covering member 35. That is, each notch 354 is arranged between two adjacent protrusion parts 353. The notch 354 is used for accommodating the outlet part 322 of the corresponding winding coil 32. The outlet part 322 of the corresponding winding coil 32 is transferred through any two notches 354, and fixed on the first end surface 341 of the metallic post 34. For smoothly connecting the outlet part 322 of the winding coil 32 with the metallic post 34, the bottom surface of the notch 354 is at a level lower than the first end surface 341 of the metallic post 34. Since the first end surface 341 of the metallic post 34 is at a level higher than the bottom surface of the notch 354, the outlet part 322 of the winding coil 32 can be easily contacted with the first end surface 341 of the metallic post 34. Moreover, for accommodating the outlet part 322 of the winding coil 32 within the notch 354, the top surface of the protrusion part 353 is not lower than the first end surface 341 of the metallic post 34. In some embodiments, the outlet part 322 of the winding coil 32 is accommodated within two opposed notches 354. That is, the two notches 354 are arranged along a line passing through a center position of the first end surface 341 of the metallic post 34. Consequently, the outlet part 322 of the winding coil 32 can be transferred through the two notches 354, and fixed on the first end surface 341 of the metallic post 34. Since the outlet part 322 of the winding coil 32 is transferred through the center position of the first end surface 341 of the metallic post 34, the winding coil 32 can be precisely welded and positioned.

Preferably, the covering member 35 comprises even-numbered protrusion parts 353 and even-numbered notches 354, and the protrusion parts 353 are discretely arranged at regular intervals. Consequently, the outlet part 322 of the winding coil 32 can be transferred through the two opposed notches 354 and fixed on the center position of the first end surface 341 of the metallic post 34. Moreover, the metallic post 34 further comprises an extension part 343 having the second end surface 342, which is not covered by the covering member 35. And through the extension part 343, the metallic post 34 can be connected with the circuit board 33 more easily. In some embodiments, the metallic post 34 is made of copper or any other appropriate conductive material, and the covering member 35 is produced by a plastic molding process or a low pressure injection process. Moreover, a portion of the metallic post 34 is covered by the covering member 35. Consequently, even if the distance between the stator core 31 and the metallic post 34 is very small, the voltage-withstanding capability is enhanced.

Figure 7:
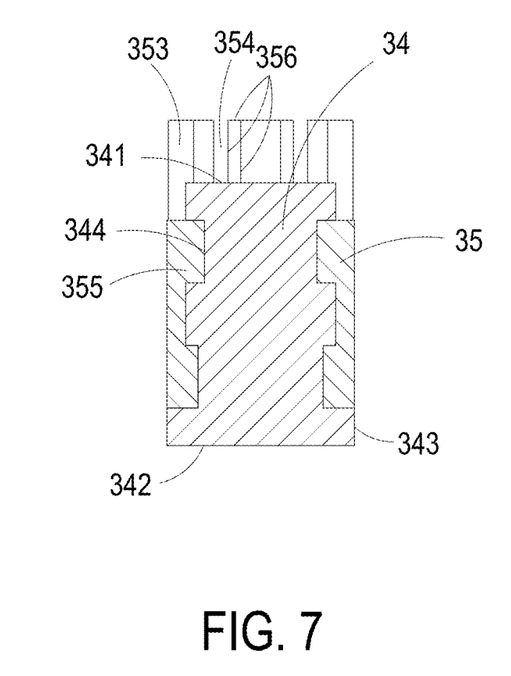
FIG. 7 is a schematic cross-sectional view illustrating the wire-managing structure of FIG. 4.

FIG. 7 is a schematic cross-sectional view illustrating the wire-managing structure of FIG. 4. In case that the covering member 35 is produced by a plastic molding process or a low pressure injection process, at least one concave structure 344 is formed in a side surface of the metallic post 34. Under this circumstance, the covering member 35 is a sleeve, and at least one convex structure 355 is formed on an inner side surface of the covering member 35. The concave structure 344 is engaged with the convex structure 355. Due to the engagement between the concave structure 344 and the convex structure 355, the metallic post 34 and the covering member 35 are firmly coupled with each other. Under this circumstance, the covering member 35 will not be easily detached from the metallic post 34. It is noted that the relationship between the convex structure and the concave structure is not restricted. For example, in another embodiment, at least one convex structure is formed on a side surface of the metallic post 34, and at least one concave structure is formed in an inner side surface of the covering member 35. The concave structure is engaged with the convex structure. In an embodiment, the metallic post 34 is a cylindrical post. However, the shape and size of the metallic post 34 may be varied according to the practical requirements.

In some embodiments, the number of the protrusion parts 353 is determined according to the thickness of the metallic post 34. For example, in case that the thickness of the metallic post 34 increases, more protrusion parts 353 are used. In some other embodiments, the width and depth of the notch 354 may be determined according to the diameter of the outlet part 322 of the winding coil 32. For example, in case that the diameter of the outlet part 322 of the winding coil 32 increases, the width and depth of the notch 354 increase. Due to the protrusion parts 353 and the notches 354 of the covering member 35, the precision of positioning and welding the outlet part 322 of the winding coil 32 can be increased, and the wire-managing angle can be easily adjusted. Under this circumstance, the false welding problem is overcome, and the product reliability is enhanced. In some embodiment, the sidewalls 365 of each protrusion part 353 are curvy.

Figure 8:
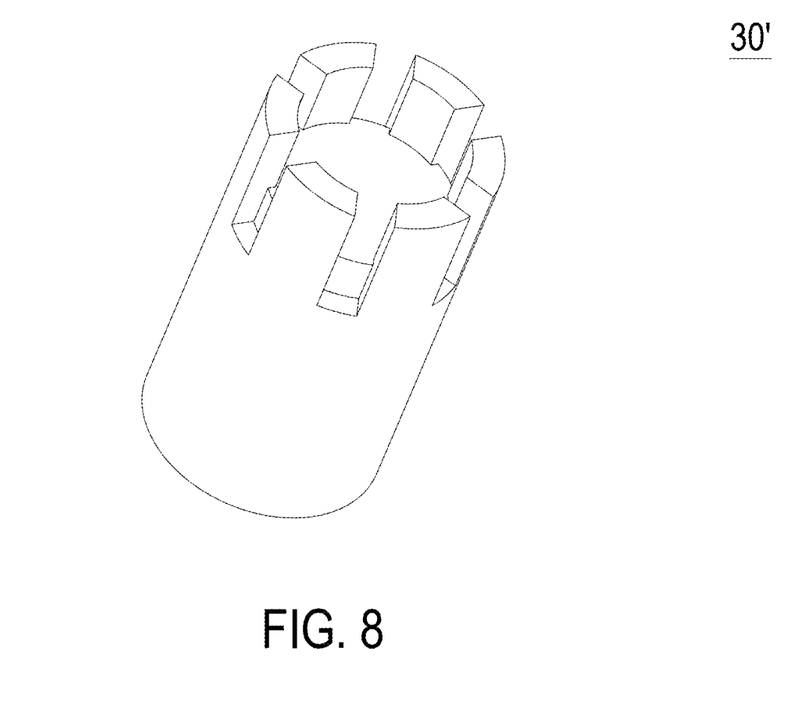
FIG. 8 is a schematic perspective view illustrating another exemplary wire-managing structure used in the motor stator assembly of FIG. 3.

FIG. 8 is a schematic perspective view illustrating another exemplary wire-managing structure used in the motor stator assembly of FIG. 3. In comparison with the wire-managing structure 30 of FIG. 4, the metallic post and the covering member of the wire-managing structure 30' of this embodiment are made of the same material. In this embodiment, the metallic post and the covering member of the wire-managing structure 30' are integrally formed with each other by a metallurgy technology. For example, after conductive powder and other ingredients are mixed together and sintered at a high temperature, the metallic post and the covering member are integrally formed with each other. Consequently, the fabricating cost of the wire-managing structure is largely reduced. In an embodiment, the metallic post and the covering member of the wire-managing structure 30' are produced by stamping a good ductile and conductive material (e.g., copper, aluminum or zinc). Consequently, the metallic post and the covering member are integrally formed with each other.

From the above descriptions, the present invention provides the motor stator assembly and the wire-managing structure. Since the outlet part of the winding coil is directly connected with the metallic post without the assistance of the jig tool, the operating time is largely reduced. In accordance with the conventional technology, the insulation layer of the stator core and the enamel coat of the winding coil are readily scratched during the process of removing or placing the jig tool. Since no jig tool is used according to the present invention, the precision of positioning and welding the outlet part of the winding coil will be increased and the false welding problem will be overcome. Under this circumstance, the product reliability is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor stator assembly, comprising:
a stator core comprising plural poles;
at least one winding coil wound around the plural poles of the stator core, wherein the at least one winding coil comprises at least one outlet part;
a circuit board;
at least one metallic post, wherein each metallic post has a first end surface and a second end surface, and the second end surface of the metallic post is attached on the circuit board; and
at least one covering member for partially covering the metallic post, wherein the covering member comprises plural protrusion parts and plural notches, and each of the plural notches is arranged between two adjacent protrusion parts, wherein a bottom surface of the notch is not higher than the first end surface of the metallic post, and a top surface of the protrusion part is not lower than the first end surface of the metallic post,
wherein the outlet part of the winding coil is accommodated within at least two of the plural notches and fixed on the first end surface of the metallic post.

2. The motor stator assembly according to claim 1, wherein each of the at least one metallic post is arranged between two adjacent ones of the plural poles.

3. The motor stator assembly according to claim 1, wherein the stator core is disposed on the circuit board.

4. The motor stator assembly according to claim 1, wherein the stator core further comprises a ring-shaped part, wherein the plural poles are connected with the ring-shaped part, and externally or internally extended from the ring-shaped part along a radial direction, wherein the plural poles are discretely arranged at regular intervals.

5. The motor stator assembly according to claim 1, wherein the motor has n phases, and the motor stator assembly comprises (n+1) metallic posts or n metallic posts.

6. The motor stator assembly according to claim 1, wherein the stator core is made of silicon steel.

7. The motor stator assembly according to claim 1, wherein the circuit board is a flexible printed circuit board.

8. The motor stator assembly according to claim 1, wherein the outlet part of the winding coil is accommodated within two opposed notches of the plural notches, wherein the two opposed notches are arranged along a line passing through a center position of the first end surface of the metallic post.

9. The motor stator assembly according to claim 1, wherein aside wall of each protrusion part is curvy.

10. The motor stator assembly according to claim 1, wherein the at least one covering member is made of an insulation material, and produced by a plastic molding process or a plastic injection process.

11. The motor stator assembly according to claim 10, wherein at least one concave structure is formed in a side surface of the metallic post, the covering member is a sleeve, and at least one convex structure is formed on an inner side of the covering member, wherein the concave structure is engaged with the convex structure.

12. The motor stator assembly according to claim 10, wherein at least one convex structure is formed on a side surface of the metallic post, the covering member is a sleeve, and at least one concave structure is formed in an inner side surface of the covering member, wherein the convex structure is engaged with the concave structure.

13. The motor stator assembly according to claim 1, wherein the metallic post and the corresponding covering member are integrally formed with each other.

14. The motor stator assembly according to claim 13, wherein the metallic post and the covering member are integrally formed with each other by sintering conductive powder or stamping conductive material.

15. A wire-managing structure for a motor stator assembly, the motor stator assembly comprising a circuit board and a stator core, the wire-managing structure comprising:
  a metallic post having a first end surface and a second end surface, wherein the second end surface is attached on the circuit board; and
  a covering member for partially covering the metallic post, wherein the covering member comprises plural protrusion parts and plural notches, and each of the plural notches is arranged between two adjacent protrusion parts, wherein a bottom surface of the notch is not higher than the first end surface of the metallic post, and a top surface of the protrusion part is not lower than the first end surface of the metallic post.

* * * * *